June 30, 1936.  C. C. HARALSON  2,045,909
AUTOMATIC SHUT-OFF VALVE FOR TANKS
Filed Aug. 30, 1934  2 Sheets-Sheet 2
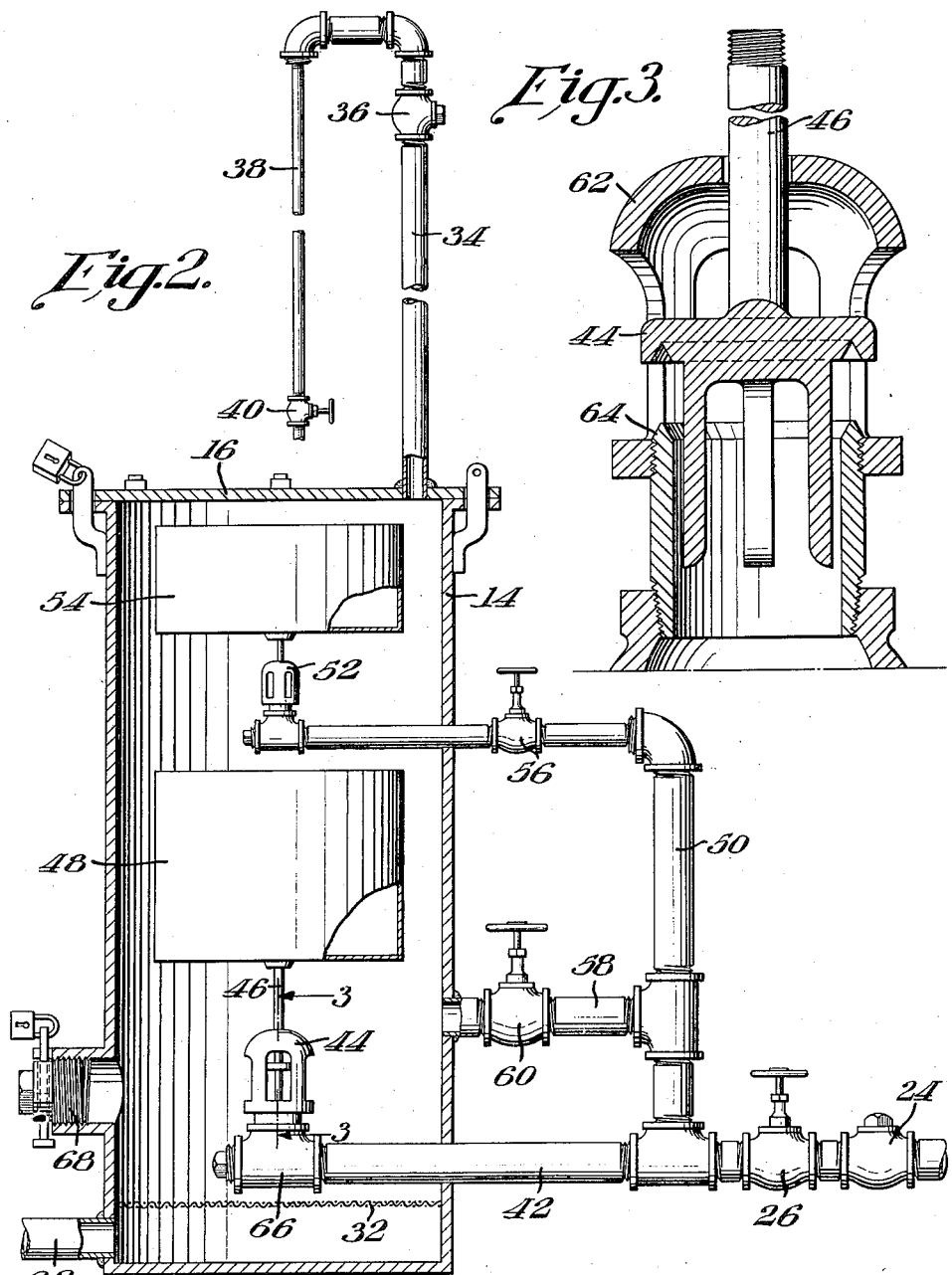
Cull C. Haralson
INVENTOR
BY R. J. Dearborn
his ATTORNEY Patented June 30, 1936

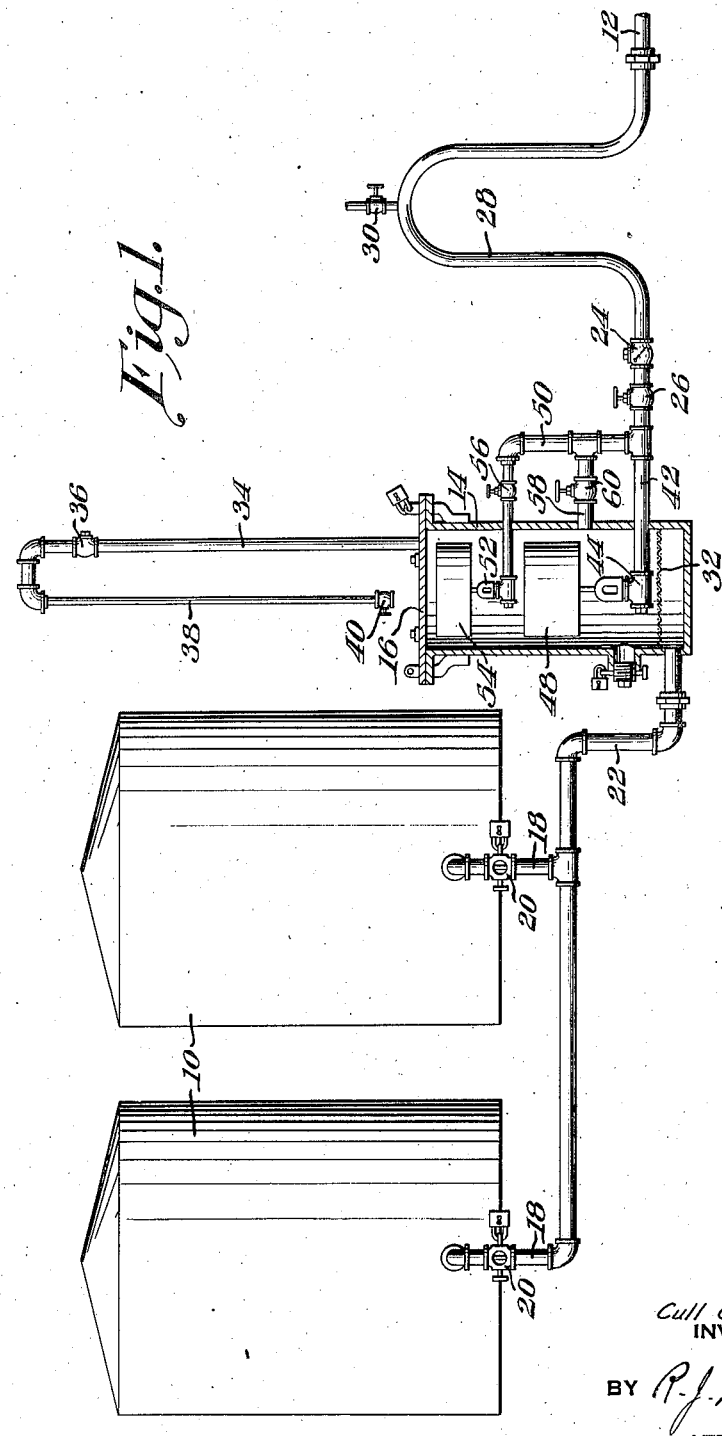

2,045,909

UNITED STATES PATENT OFFICE 2,045,909

AUTOMATIC SHUT-OFF VALVE FOR TANKS

Cull C. Haralson, Olney, Tex., assignor to The Texas Company, New York, N. Y., a corporation of Delaware Application August 30, 1934, Serial No. 742,031

3 Claims. (Cl. 137—68)

This invention relates to automatic shut-off valves and more particularly to valves for shutting off the suction or draw-off line from a tank or reservoir when the liquid has been removed therefrom to such an extent that air would tend to enter the suction line.

The principal object of the invention is to provide an automatically operable valve which will securely close off a suction line and in conjunction therewith an automatic pilot valve which will insure the operation of the main valve and prevent the latter from being held closed due to an excessive suction on the draw-off line.

A further object of the invention is to provide a valve arrangement of this type which will involve a minimum number of movable parts and which will be simple and positive in operation.

It is well known that air or other gas in a pipe line is very detrimental to the efficient operation of the line. Since air will seek the highest point in a pipe line it will frequently pass backwardly in such a line being used to draw off a liquid from a tank arranged at a higher level than the line. The air thus passing backwardly through the line and into a tank of oil, for instance, will set up currents in the oil which will cause turbulence and stir up the sediment or water which may be at the bottom of the tank. This sediment and water will then be drawn into the pipe line with the oil and will cause an accumulation of sediment in the tank bottoms and pumps at the pumping stations located along the pipe line. The air passing backwardly into a tank of oil will also cause the oil to evaporate more rapidly, thus causing an undesired change in the gravity of the oil.

In oil pipe lines of small diameter a portion of the air trapped in the line may be carried along with the oil to the pump moving the oil. A portion of this air may then remain in the pump with the result that the pump may be air bound and incapable of moving the liquid. The lining and packing in pumps which frequently become air bound wear out much more rapidly than pumps which are always full of the liquid. Gaugers and other operators frequently spend considerable time each day in bleeding trapped air from the pipe line pumps.

Oil containing paraffine will not clog or stop up a pipe line unless air or other gas is present therein. Again, oil containing corrosive elements will not attack the steel inside the pipe or pump unless air or gas is present.

Several ways have been tried to solve the problem of air in pipe lines with rather unsatisfactory results. The simplest and most effective way of keeping air from the lines is to shut the tank off the instant that the oil has been moved from the tank but, obviously, this cannot always be done by the operator since the tanks empty at all hours of the day and night and it would be impracticable to maintain an operator at each tank to shut it off the instant that all of the oil has been removed.

In accordance with the invention, an automatic shut-off valve has been provided, this valve being connected in the suction or draw-off line at a point fairly close to the tank from which the oil is being drawn. The valve arrangement comprises in effect, two float actuated valves mounted within a housing adapted to be maintained full of oil as long as there is oil in the tank being drained. One of the valves is the main draw-off valve and is connected directly at the intake end of the suction pipe line, while the other is a pilot valve also float actuated and arranged above the main valve within the housing. The pilot valve is connected to a branch extension from the main pipe line. An air vent tube having a check valve is connected to the top of the housing and extends upwardly as high as the top of the tank being drained. When the pipe line is first opened, oil will pass from the tank into the housing and the main float valve may be opened, thus allowing oil to pass directly into the suction line. In case the main valve does not open the pilot valve will be opened as soon as the housing has become substantially full of oil and the oil passing through the branch extension will break the suction in the main valve, thus allowing the latter to open. Any air in the housing will be exhausted through the air vent line. When all of the oil has been drawn from the tank, air will pass into the housing to replace the oil and the valves will close thus preventing any air from passing into the suction or main pipe line. The check valve in the air vent line will prevent air from entering the housing and will thus maintain the housing full of oil until air has entered therein from the tank being drained.

For a better understanding of my invention, reference may be had to the accompanying drawings in which Figure 1 is an elevation partly in section showing a battery of tanks, connecting pipe lines and the float valve assembly. Figure 2 is a larger sectional elevation of the valve arrangement while Figure 3 is a sectional elevation on the line 3—3 of Figure 2 showing the valve structure in detail.

Referring to Figure 1 of the drawings, a battery of tanks 10 are adapted to be connected to a draw-off or suction pipe line 12 and between the tanks and the suction line is mounted a housing 14, this housing being provided with a cover member 16 which is normally maintained tightly closed. The housing 14 is preferably mounted at a point at substantially the same elevation as the bottom of the tanks 10. A pair of drain pipes 18 having lock valves 20 disposed therein connect the tanks to a pipe 22 which in turn is connected to the housing 14 near the bottom thereof. The suction line 12 is provided with a check valve 24, a gate valve 26 and an air-bend 28. An air-bend relief valve 30 is connected to the top of the bend 28 and may be used to test the suction line 12 for pressure or it may be used for the installation of a vacuum valve.

The housing 14 is provided in its lower portion with a screen 32 which serves to prevent sediment from the tanks 10 entering the suction line. An air vent tube 34 is connected to the top of the housing 14 and is provided with a check valve 36 opening outwardly and an air release pipe 38 and an auxiliary air release valve 40. The air vent tube 34 should preferably extend upwardly substantially as high as the top of the tanks 10 for a reason which will be pointed out hereinafter.

A main outlet pipe 42 is connected in the suction line 12 and extends into the lower portion of the housing 14. A main valve 44 shown in detail in Figure 3 is connected to the intake end of the outlet pipe 42 and connected to the valve stem 46 is a float member 48.

An extension or branch pipe 50 is connected to the outlet pipe 42 and extends upwardly and into the housing 14 at a point above the main valve 44. A pilot valve 52 similar in construction but smaller than the main valve 44 is connected to the intake end of the branch 50 and to the valve stem of the pilot valve is connected a pilot float 54. An auxiliary valve 56 is mounted in the branch line 50 and a by-pass line 58 provided with a hand operated valve 60 is connected between the branch 50 and the housing 14.

The main valve 44 comprises a cage 62 and a seat 64, the latter being connected through a suitable tee or other device 66 to the outlet pipe 42. As has been stated, the pilot valve 52 is substantially the same but somewhat smaller than the main valve 44.

Assuming that one of the tanks 10 is empty and the oil level in the housing 14 is substantially midway of the main float 48 with the remaining space in the housing filled with air, and that the valves 26, 40 and 56 are open with the valve 60 closed and that there is a suction in the pipe line 12, the appropriate valve 20 will then be opened and the oil from the full tank will flow into the lower portion of the housing 14 through the cleaning screen 32. The oil will rise in the housing 14 and the buoyancy of the float 48 may or may not cause the main valve 44 to open, depending on the amount of suction in the line 12. The oil will continue to rise in the housing forcing the air therein outwardly through the vent tube 34 and check valve 36 until it has reached a level in the tube 34 substantially the same as the level in the tank 10 being drained. As soon as the oil reaches the pilot float 54 that valve will open, thus allowing oil to pass through the branch 50, reducing the suction on the main valve 44 and allowing the float 48 to rise, in case the main valve had previously remained closed due to the suction in the line 12. As soon as the main valve 44 opens, the oil will flow directly from the tank through the outlet pipe 42 and the branch 50 to the suction line 12 and this will continue as long as the suction is maintained and there is oil in the tank 10.

A lock-plug 68 is threaded into one side of the housing 14 and this plug may be removed when it is desired to inspect the valve 44.

As soon as the oil in the tank being drained and in the pipe 22 has been removed air will enter the housing 14 through the pipe 22 and will pass upwardly through the air vent tube 34 displacing the oil which had been trapped in the vent tube. The oil will continue to be drawn from the housing 14 and as soon as the level is lowered below the float 54 the pilot valve 52 will close. When the oil level has been further lowered to a point about midway of the float 48 the main valve 44 will likewise close, thus preventing any air from entering the suction line 12. When it is desired to drain another tank the operation will be repeated as has been described.

In case it is desired to pass oil directly through the housing into the suction line 12 such as in case of a possible failure of both of the float valves 44 and 52, the valve 60 may be opened. The valve 60 may also be used to open the main valve 44 in case of a failure of the pilot valve 52. The valve 26 will be closed in the case of inspection of the float valves in order to prevent air from entering the suction line. The purpose of the air-bend 28 is merely to cause the check valve 24 to be covered with oil at all times.

Obviously many modifications and variations of the invention, as hereinbefore set forth, may be made without departing from the spirit and scope thereof, and therefore, only such limitations should be imposed as are indicated in the appended claims.

I claim:

1. In combination, a housing having a chamber adapted to be filled with a liquid, a suction outlet conduit connected to said housing, a main valve at the end of said conduit within said housing, a float connected to said valve for normally maintaining said valve open when the liquid level in said chamber is above said float, a branch conduit connected to said suction conduit and to said housing, a pilot valve at the end of said branch conduit within said housing and above said main valve, and a second float connected to said pilot valve for opening said pilot valve to reduce the suction in said suction conduit when the liquid in said housing reaches a height sufficient to raise said second float.

2. In combination, a housing adapted to hold a liquid, a suction line connected to said housing, a valve in said housing connected to the intake end of said suction line, a float for controlling the opening and closing of said valve in accordance with the height of the liquid in said housing and means for reducing the suction in said suction line in case said valve should fail to open when the liquid in said housing rises above said float, said last named means comprising a by-pass conduit connected between said suction line and the upper portion of said housing and a float-actuated pilot valve in the housing end of said by-pass conduit, said pilot valve being adapted to open when the liquid in said housing rises above said pilot valve.

3. An automatic shut-off device comprising a substantially closed housing adapted to be filled with a liquid, a draw-off conduit extending into said housing, a valve at the intake end of said conduit within said housing, a float operably connected to said valve and responsive to the level of the liquid in said housing, a branch pipe from said draw-off conduit extending into said housing above said float controlled valve, a pilot valve mounted in the intake end of said branch pipe, and a float operably connected to said pilot valve for opening said pilot valve to reduce the suction in said draw-off conduit when the liquid level reaches a height sufficient to raise said last mentioned float.

CULL C. HARALSON.